(12) United States Patent
Varone

(10) Patent No.: US 12,030,194 B1
(45) Date of Patent: Jul. 9, 2024

(54) SIX DEGREES OF FREEDOM ANCHORING DEVICE AND METHOD FOR ROBOTIC INSTALLATION

(71) Applicant: Diamond Age 3D, Inc., Phoenix, AZ (US)

(72) Inventor: Russell Varone, Phoenix, AZ (US)

(73) Assignee: Diamond Age 3D, Inc., Phoenix, AZ (US)

( * ) Notice: Subject to any disclaimer, the term of this patent is extended or adjusted under 35 U.S.C. 154(b) by 14 days.

(21) Appl. No.: 17/929,283

(22) Filed: Sep. 1, 2022

Related U.S. Application Data

(60) Provisional application No. 63/239,405, filed on Sep. 1, 2021.

(51) Int. Cl.
| | | |
|---|---|---|
| *B25J 9/16* | (2006.01) | |
| *E04G 5/00* | (2006.01) | |
| *E04G 5/02* | (2006.01) | |
| *F16M 11/04* | (2006.01) | |
| *F16M 11/14* | (2006.01) | |

(52) U.S. Cl.
CPC ............ *B25J 9/1687* (2013.01); *E04G 5/007* (2013.01); *E04G 5/02* (2013.01); *F16M 11/043* (2013.01); *F16M 11/14* (2013.01)

(58) Field of Classification Search
CPC ............ E04H 12/2215; E04H 12/2223; E04H 12/223; F16B 43/02; F16M 11/14; F16M 11/043; F16C 11/06; B25J 9/1687; E04G 5/007; E04G 5/02

USPC .... 248/156, 545, 530, 181.2, 181.1, 288.31, 248/288.51; 411/537–538
See application file for complete search history.

(56) References Cited

U.S. PATENT DOCUMENTS

| | | | | |
|---|---|---|---|---|
| 6,328,270 | B1 * | 12/2001 | Elberbaum | F16L 27/04 403/27 |
| 7,603,820 | B1 * | 10/2009 | Lai | E06B 3/5436 403/56 |
| 2010/0252978 | A1 * | 10/2010 | Philippe | F16M 11/14 269/309 |
| 2012/0096778 | A1 * | 4/2012 | Bauletti | E04H 12/2215 52/155 |
| 2014/0174003 | A1 * | 6/2014 | Despotellis | E02D 5/80 52/169.13 |
| 2017/0343023 | A1 * | 11/2017 | Schevers | F16B 5/025 |

* cited by examiner

*Primary Examiner* — Christopher Garft
(74) *Attorney, Agent, or Firm* — Cooley LLP

(57) ABSTRACT

An apparatus has an anchor shaft with a distal end configured to be embedded into a selected anchor location. A base plate has an aperture to receive the anchor shaft. A mounting ring surrounds the aperture. An inner collar is adjustably mounted on the mounting ring. A lower bearing seat is positioned in the inner collar. A spherical bearing is positioned in the lower bearing seat. The spherical bearing engages a proximal end of the anchor shaft. An upper bearing seat is positioned over the spherical bearing. An outer collar is mounted on the inner collar. The upper bearing seat, the spherical bearing, and the lower bearing seat are compressed between the outer collar and the inner collar, such that the anchor shaft is selectably mounted to the base plate and has six degrees of configurable positions.

4 Claims, 15 Drawing Sheets

SIX DEGREES OF FREEDOM ANCHORING DEVICE AND METHOD FOR ROBOTIC INSTALLATION

This application claims priority to U.S. Provisional Patent Application No. 63/239,405, filed Sep. 1, 2021, the contents of which are incorporated herein by reference.

FIELD OF THE INVENTION

The invention relates generally to anchoring physical structures to the ground for stabilization, safety, and positional fixation. More particularly, the invention is directed to a six degrees of freedom anchoring device and method for robotic installation.

BACKGROUND

Mechanized construction, particularly construction that requires the long-term placement of tools and structures in a working site, presents unique demands to equipment operators in the field. It is recognized as necessary to ensure that structures are mounted not only in the correct 'grid' within a work site but are also positioned at the correct inclination and heading relative to other fixed structures. Conventional systems for mounting structures in this manner are typically defined within six degrees of freedom (6DOF) compliance systems. Namely, these degrees are typically identified as linear translation along the X, Y, and Z axes; in combination with rotation about three orthogonal axes for roll, pitch, and yaw as indicated in FIG. 1.

Conventional systems and anchoring methods typically use distributed reinforcements under tension (e.g., guy-lines and anchoring bolts) and compression (dead-weight anchors, compacted soil, etc.) that are arranged in opposition to each other such that the structure acted upon is maneuvered into a desired position. Though conventionally effective, these systems are inefficient in their distribution—separating the means of controlling each of the 6DOF into separate adjustable mechanisms complicates the installation of each structure, delaying the commissioning of the supported structures.

It is further understood that conventional ground anchoring systems typically require very close adherence to plumb (vertical orientation in relation to the pull of gravity, normal to a ground surface), level (parallel to ground) and square (symmetrically spaced with other members in the system). The combination of requisite close-tolerances and the relatively clumsy adjustment mechanisms for attaching the tolerances presents a challenge that needs to be addressed.

SUMMARY

An apparatus has an anchor shaft with a distal end configured to be embedded into a selected anchor location. A base plate has an aperture to receive the anchor shaft. A mounting ring surrounds the aperture. An inner collar is adjustably mounted on the mounting ring. A lower bearing seat is positioned in the inner collar. A spherical bearing is positioned in the lower bearing seat. The spherical bearing engages a proximal end of the anchor shaft. An upper bearing seat is positioned over the spherical bearing. An outer collar is mounted on the inner collar. The upper bearing seat, the spherical bearing, and the lower bearing seat are compressed between the outer collar and the inner collar, such that the anchor shaft is selectably mounted to the base plate and has six degrees of configurable positions.

DETAILED DESCRIPTION

The proposed invention provides a means for anchor systems to achieve an effective level utilizing ground-engagement members with large deviations to plumb, level, and square. This provides an advantage in time for installation, mechanical installation tolerances, and overall simplification of system set up. More specifically, the present invention incorporates an integral means for compensating for misalignment across 6DOF, separate from any structures supported thereon. In addition, to a mechanical means to overcome 6DOF misalignment, an automated means and method of installation is provided.

Figure 1:
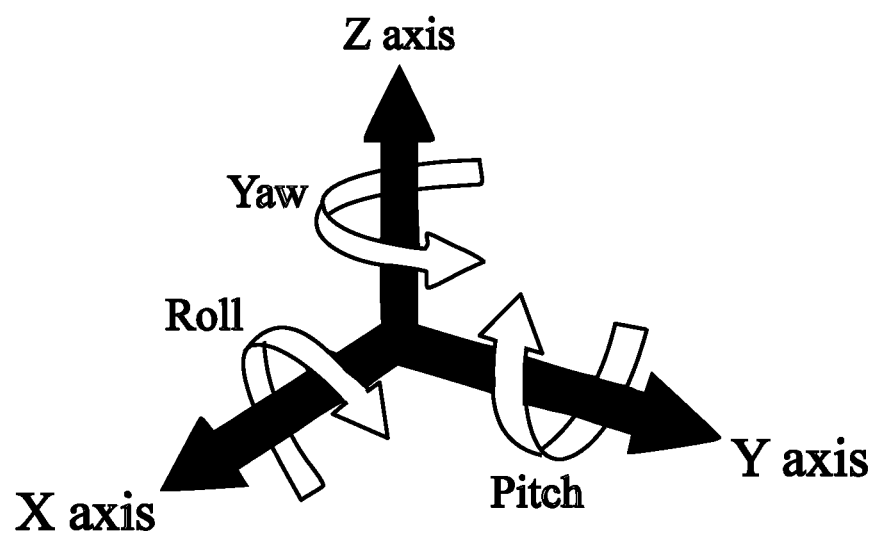
FIG. 1 is a reference image outlining six degrees of freedom (6DOF).
Figure 2:
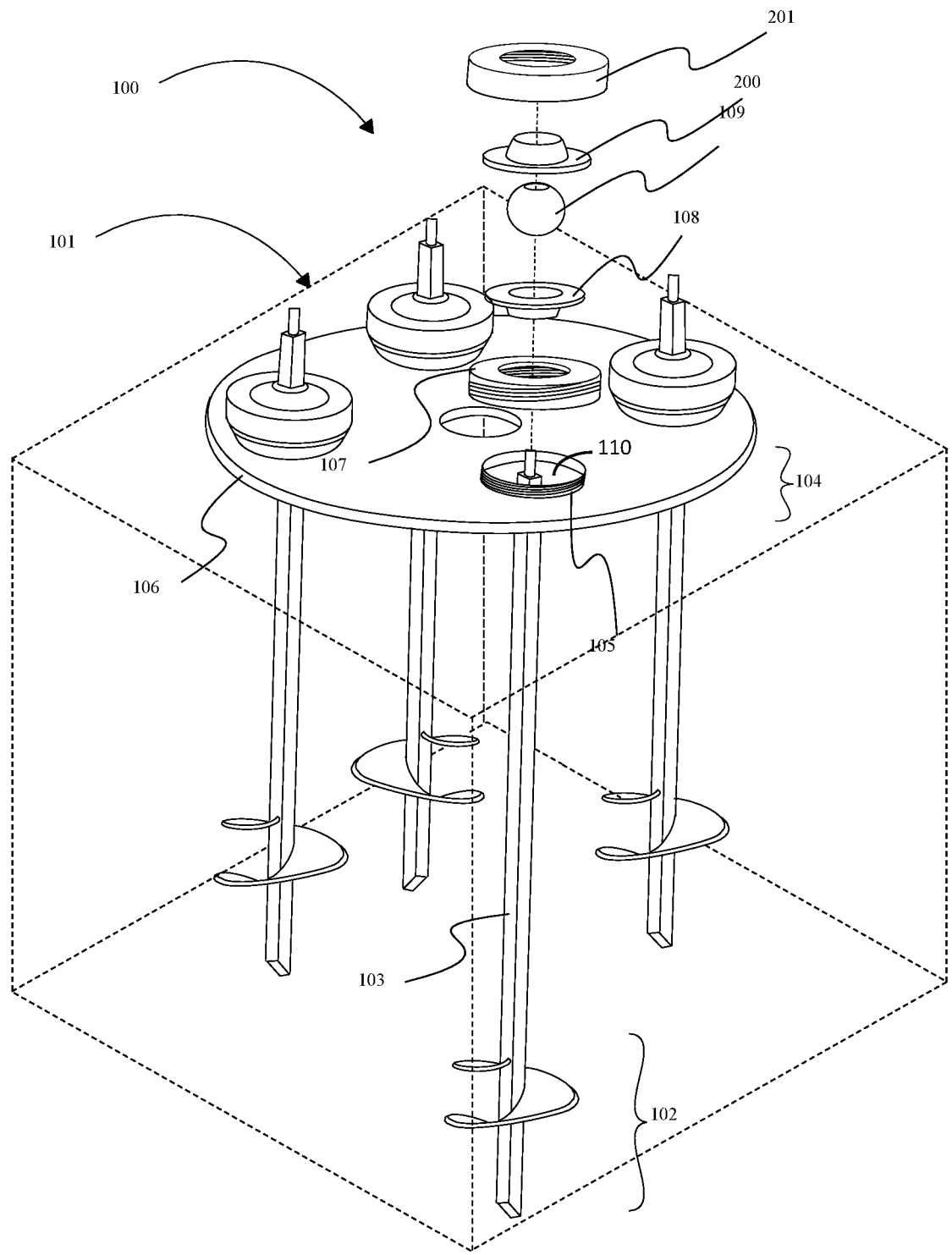
FIG. 2 is a simplified perspective view of a compensated anchor assembly constructed in accordance with an embodiment of the invention.
Figure 3:
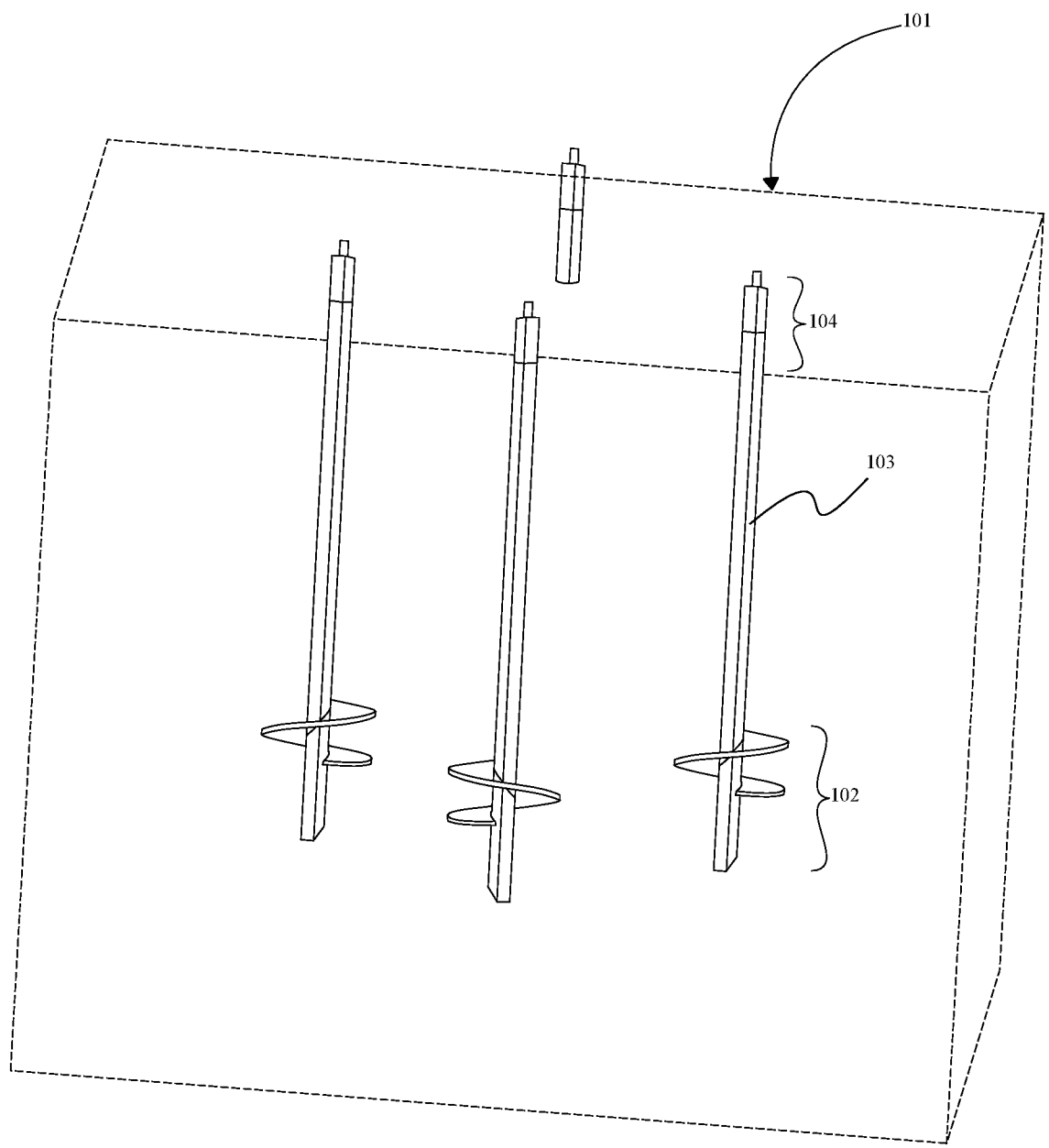
FIG. 3 is a partial section-view of an exemplary selected anchor location with at least one anchor shaft positioned in the selected anchor location.
Figure 4:
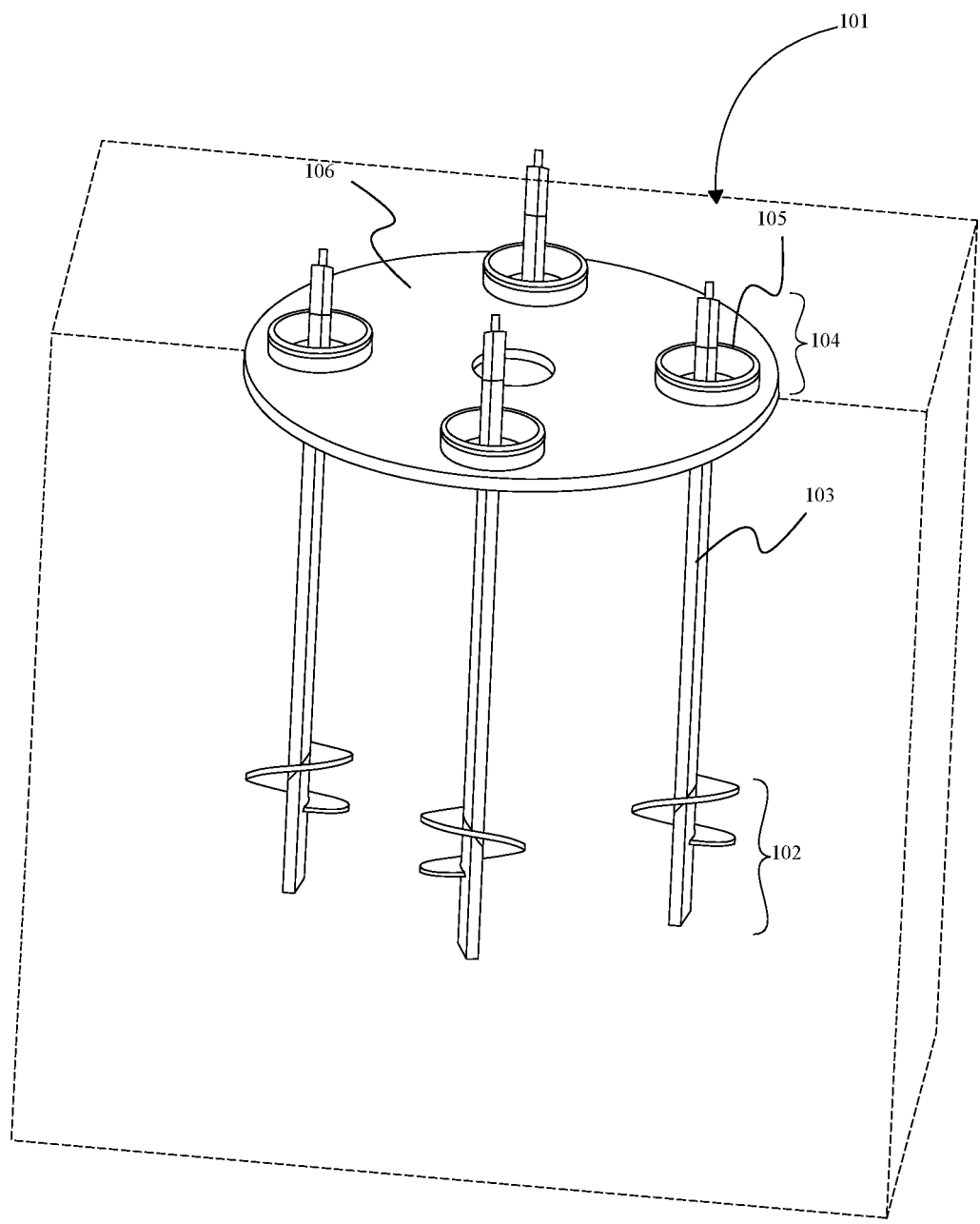
FIG. 4 illustrates a base plate positioned onto the anchor shaft.

FIGS. 2 and 3 illustrate the installation of a compensated anchor assembly 100 into a selected anchor location 101 with a distal end 102 and a proximate end 104. The compensated anchor assembly 100 includes at least one anchor shaft 103 being fixed within the selected anchor location 101. The distal end 102 of the anchor shaft 103 ideally has a self-engaging drill head or helical anchor, preferably installed via the application of controlled and sustained torque, e.g., with an industrial drill. In various alternate embodiments, the anchor shaft 103 may be replaced or supplemented with pilings, cast-in anchors, or any other ground-engagement mechanism as may be realized by one of skill in the art. Further, as shown in the exemplary embodiment, multiple instances of the at least one anchor shaft 103 may be deployed simultaneously. The installation of any arbitrary anchor shaft 103 at an angular offset to any adjacent anchor shaft 103 is not a disqualifying factor for use of either instance of the anchor shaft 103, provided that all instances are positioned within the selected anchor location 101. Splaying the anchor shaft 103 across the selected anchor location 101 may provide superior ground-fixation when compared to perfectly vertical instances.

The present invention further comprises a base plate 106 positioned over the proximal end 104 of the anchor shaft 103. The proximal end 104 of the anchor shaft 103 extends through an aperture 110 surrounded by a mounting ring 105 of the base plate 106. The base plate 106 constitutes any platform or deployable surface arranged across the selected anchor location 101 to accept at least one anchor shaft 103. It is further considered that the base plate 106 may be arranged as a foundation element to reduce ground pressure, i.e., spread any supported loads across a greater surface area, or across multiple instances of the anchor shaft 103. It is generally contemplated that the mounting ring 105 is oversized for any given anchor shaft 103, and accordingly does not perfectly bracket the proximal end 104 of the anchor shaft 103 in most instances. The capacity for compensation across the six degrees of freedom (6DOF) is generally defined by the magnitude of the mismatch between the proximal end 104 of the anchor shaft 103 and the mounting ring 105, i.e., a greater mismatch enables greater angular deflection and lateral misalignment between the anchor shaft 103 and the base plate 106. Accordingly, various embodiments of the present invention may employ variably scaled instances of the above-described components according to an anticipated need for greater compensation across 6DOF.

Figure 5:
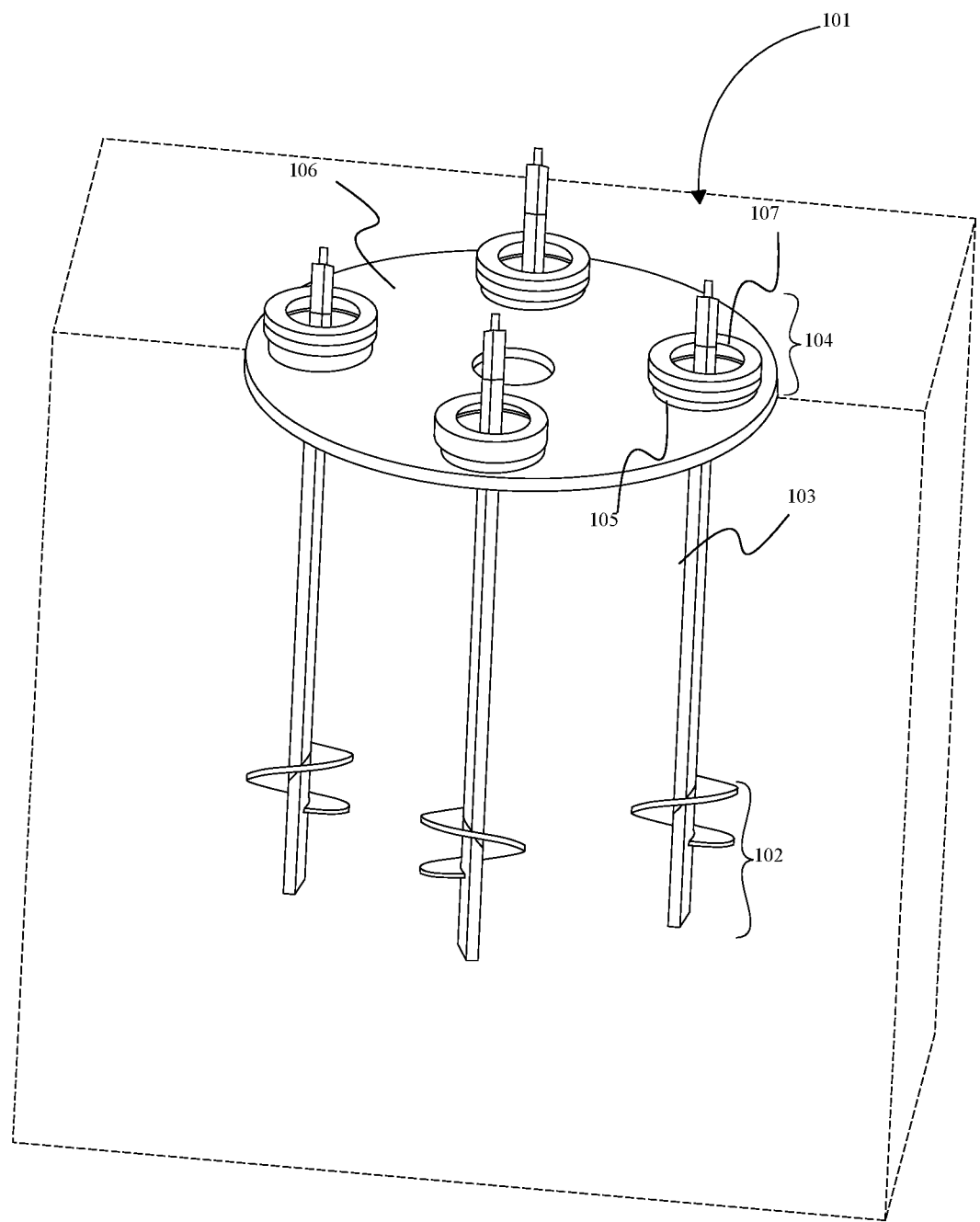
FIG. 5 illustrates an inner collar mounted to the base plate.

The present invention further comprises an inner collar 107 adjustably mounted onto the mounting ring 105. FIG. 2 illustrates this relationship in an exploded view, while FIG. 5 illustrates this relationship in an affixed view.

The inner collar 107 is configured to fit around the proximal end 104 of the anchor shaft 103, which protrudes through the mounting ring 105, such that the anchor shaft 103 intersects the center of the inner collar 107 along the vertical axis defined concentrically by the mounting ring 105. The inner collar 107 is adjustable along the mounting ring 105 to enable this alignment, i.e., the selectable positioning of the inner collar 107 enables compensation along the Z-axis as the inner collar 107 is selectably traversed along the mounting ring 105. This compensation ideally enables the associated anchor shaft 103 to be placed in compression or tension against the base plate 106, according to the requirements of any given installation.

Figure 6:
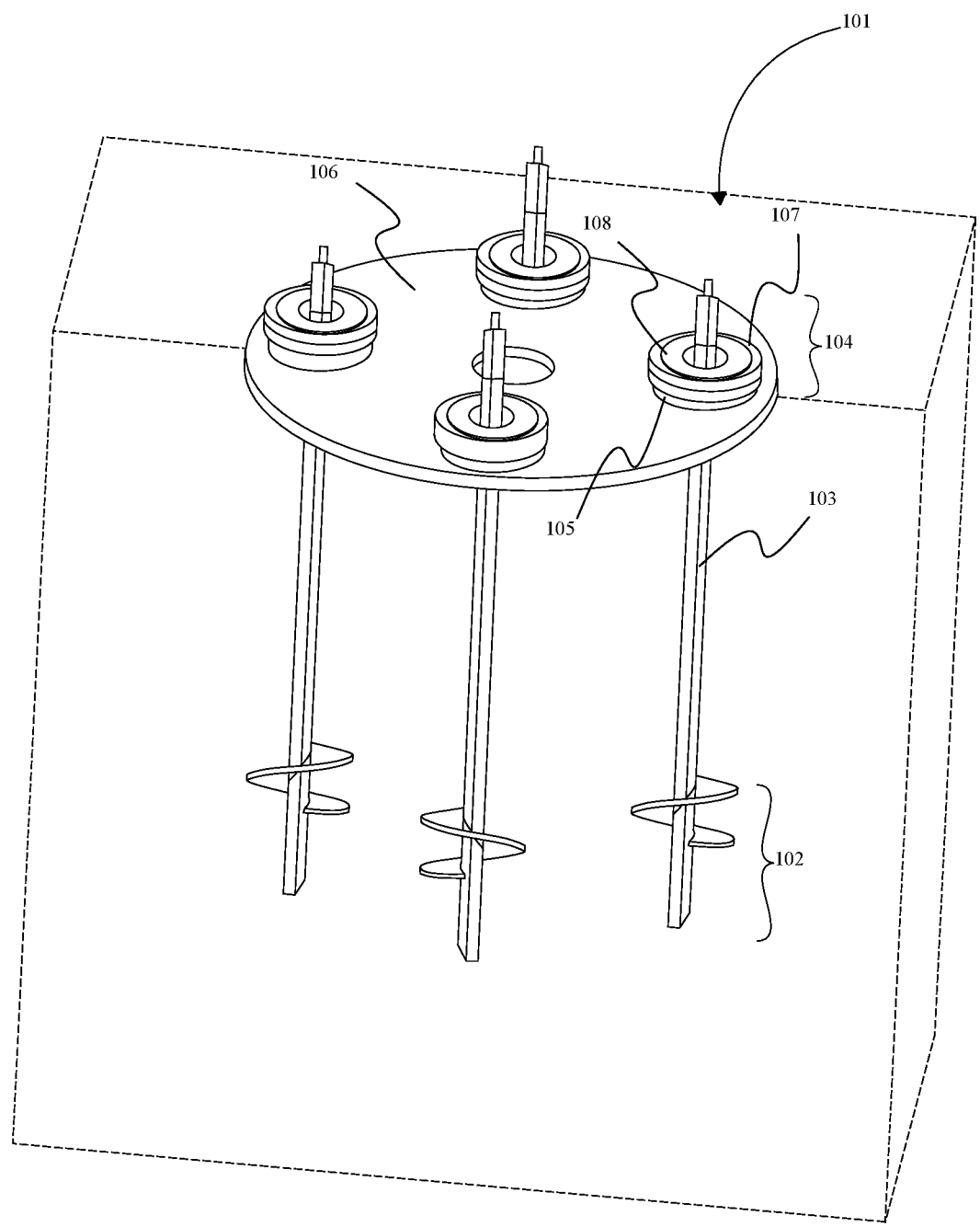
FIG. 6 illustrates a lower bearing seat positioned into the inner collar.

The present invention further comprises a lower bearing seat 108. FIG. 2 illustrates the lower bearing seat 108 in an exploded view, while FIG. 6 illustrates lower bearing seat 108 in an intact view. The lower bearing seat 108 is ideally adjustable within the inner collar 107, such that the center of the lower bearing seat 108 may be adjustably centered about the proximal end 104 of the anchor shaft 103. This adjustment across the inner collar 107 enables the present invention to compensate for displacement of the anchor shaft 103 along the X and Y axes, effectively redefining the center of the mounting ring 105 for the purposes of attaching the anchor shaft 103. This lateral compensation allows a relatively imprecise placement of the anchor shaft 103 without compromising the stability or plumb of the base plate 106.

Figure 7:
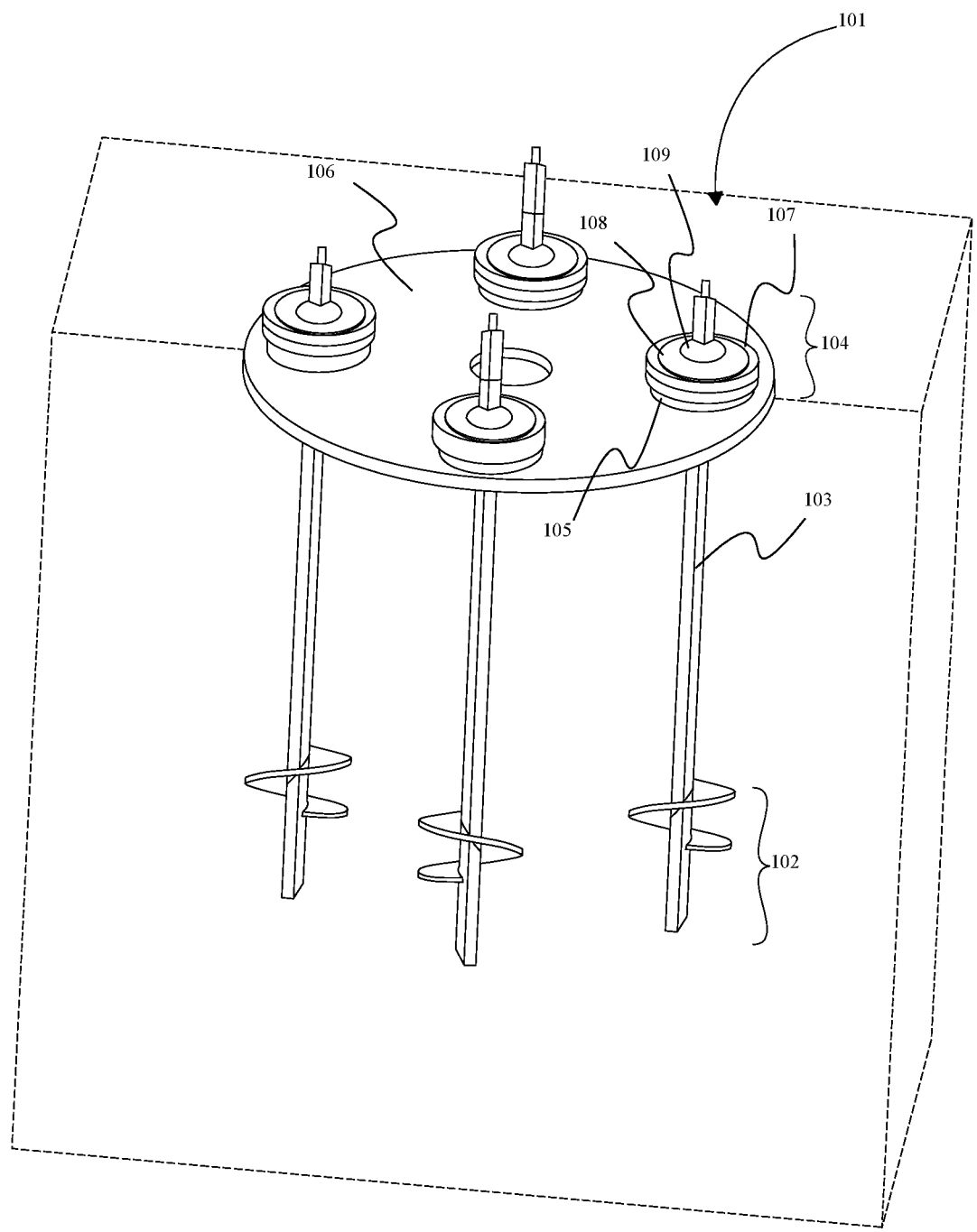
FIG. 7 illustrates a spherical bearing mounted to the anchor shaft and positioned into the lower bearing seat.

FIG. 2 illustrates a spherical bearing 109 that is slidably positioned onto the proximal end 104 of the anchor shaft 103, such that the spherical bearing 109 is positioned into the lower bearing seat 108. FIG. 7 illustrates this relationship intact.

The center of the spherical bearing 109 is ideally positioned at the intersection of the anchor shaft 103 and the central vertical axis of the mounting ring 105, providing a means for mechanically interconnecting the anchor shaft 103 to the base plate 106. The spherical bearing 109 is configured to roll freely within the lower bearing seat 108 and rotate about the anchor shaft 103, thereby enabling compensation for roll, pitch, and yaw between the base plate 106 and the anchor shaft 103.

Figure 8:
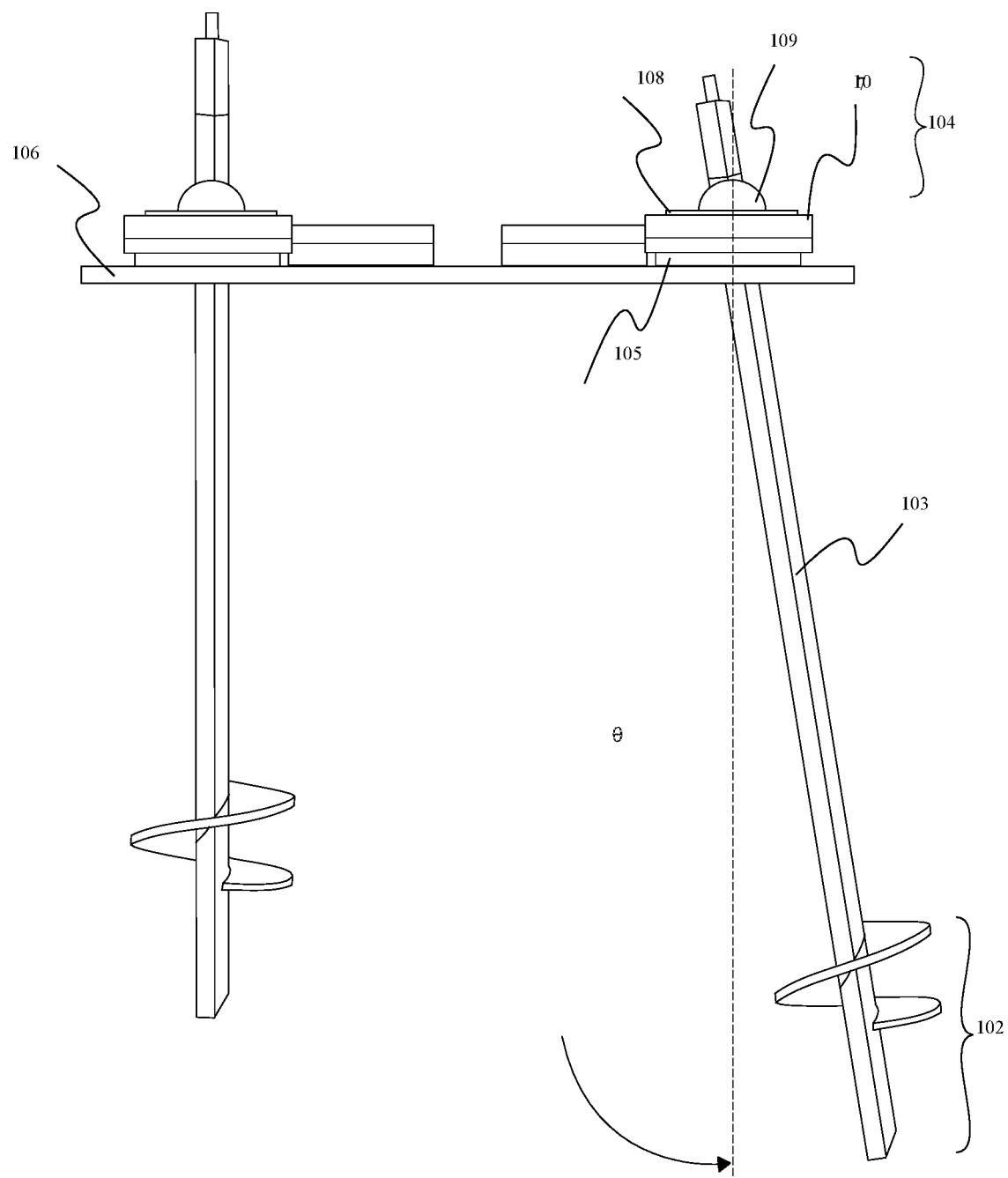
FIG. 8 illustrates the angular and vertical offsets between any two arbitrary instances of the anchor shaft.

Further, an angular deflection from the concentric axis of the mounting ring 105 (theta, $\theta$) is compensated by the spherical bearing 109 rotating within the lower bearing seat 108 as shown in FIG. 8. This angular dislocation is generally contemplated to encompass the roll, pitch, and yaw of the anchor shaft 103 relative to theta, whereby the corrective capacity of the present invention is defined within a conical range of free-motion extending from theta, $\theta$.

Figure 9:
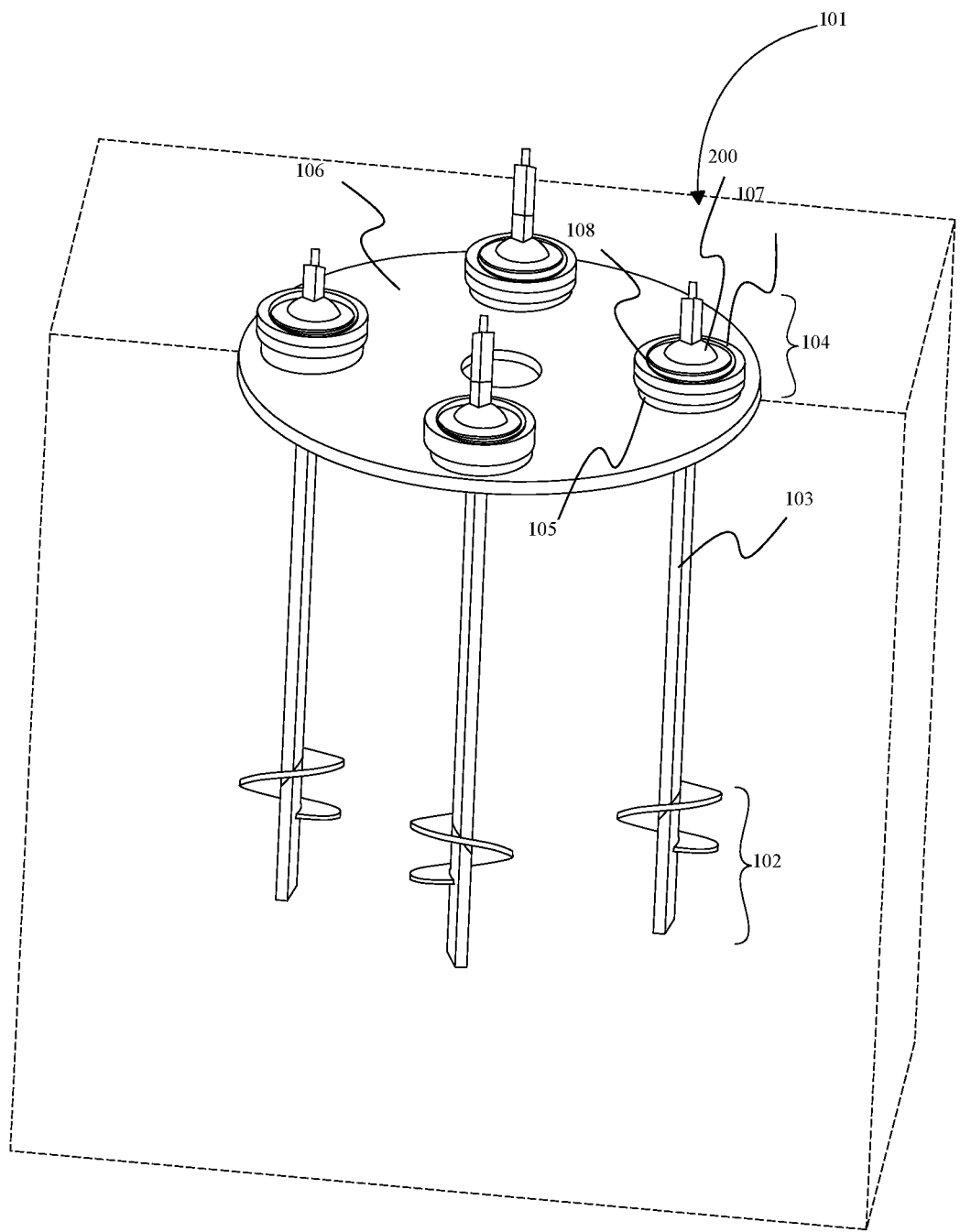
FIG. 9 illustrates an upper bearing seat positioned over the spherical bearing.

As indicated in FIG. 9, an upper bearing seat 200 (also shown in FIG. 2) is positioned onto the spherical bearing 109. The upper bearing seat 200 is likewise configured to enable the spherical bearing 109 to displace along the angular and rotational axes. In one embodiment, the lower bearing seat 108 and the upper bearing seat 200 define interchangeable components, wherein the surfaces exposed to the spherical bearing 109 are uniform.

Figure 10:
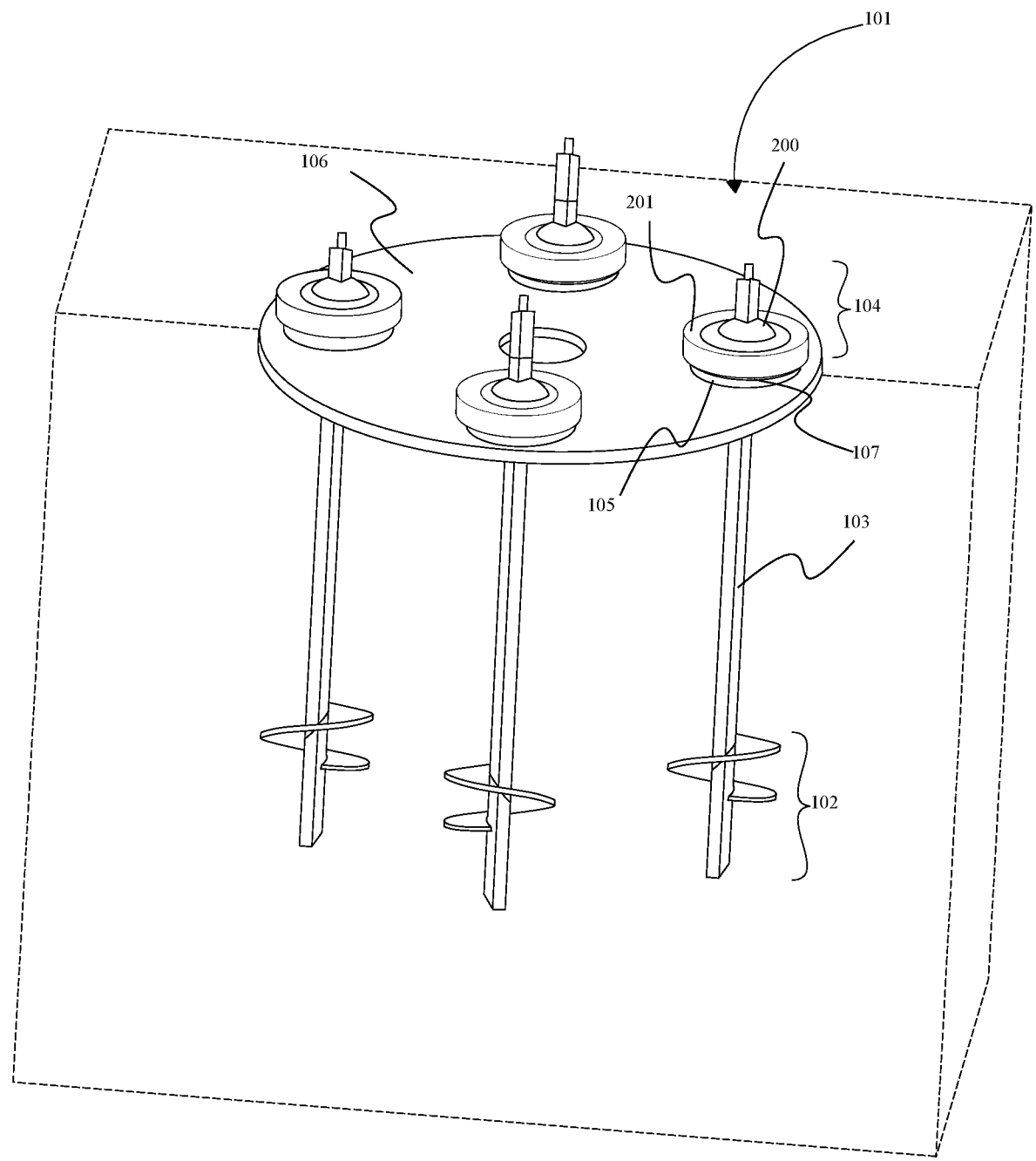
FIG. 10 illustrates an outer collar mounted to the inner collar, seizing the lower bearing seat, the spherical bearing, the upper bearing seta, and the anchor shaft by extension.

In reference to FIG. 10, an outer collar 201 (also shown in FIG. 2) is selectably mounted onto the inner collar 107 with the upper bearing seat 200, the spherical bearing 109, and the lower bearing seat 108 captured between the inner collar 107 and the outer collar 201. As the outer collar 201 is fastened to the inner collar 107, the upper bearing seat 200 and the lower bearing seat 108 are collapsed against the spherical bearing 109, rigidly fixing the spherical bearing 109 along a static orientation relative to theta, $\theta$. Accordingly, the anchor shaft 103 is rigidly captured through the spherical bearing 109, thereby fixing the base plate 106 into a desired position and orientation relative to the selected anchor location 101.

Figure 11:
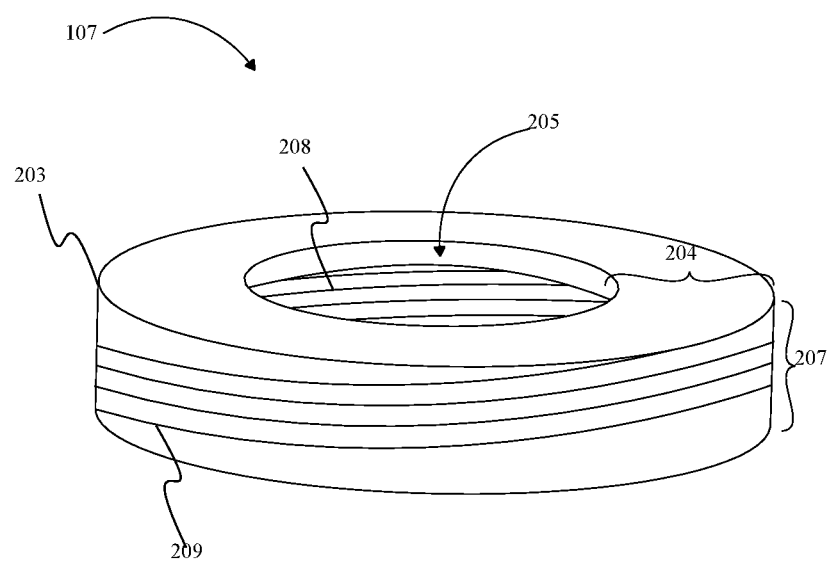
FIG. 11 is a detailed, enlarged view of an exemplary embodiment of the inner collar.

In one embodiment, the inner collar 107 further comprises an interstitial fitting 203, a first flange 204, and a first aperture 205 as indicated in FIG. 11. The interstitial fitting 203 constitutes a compressible, resilient structure configured to engage between the mounting ring 105 and the outer collar 201 as outlined previously. In at least one instance, the interstitial fitting 203 prevents the separation of the inner collar 107 and the outer collar 201 by controllably deforming under load, i.e., torque-to-yield. The interstitial fitting 203 is terminally connected to the first flange 204 such that the first flange 204 extends orthogonal to the interstitial fitting 203, thereby providing a planar surface for the lower bearing seat 108 to displace across during adjustment thereof. The first aperture 205 traverses the interstitial fitting 203 and the first flange 204 to enable the proximal end 104 of the anchor shaft 103 to protrude therethrough. It is considered that the dimensions of the first aperture 205 relative to the dimensions of the first flange 204 establish the compensation range of the present invention across the X and Y axes. Across various embodiments, the maximal compensation range may be reduced to achieve higher yield strength by extending the first flange 204 across the first aperture 205. Alternatively, the first aperture 205 may be expanded to enable greater displacement of the lower bearing seat 108 therein with a corresponding reduction of support from a minimized first flange 204.

In a related embodiment, the interstitial fitting 203 further comprises a fitting sidewall 207, a plurality of interior fitting threads 208, and a plurality of exterior fitting threads 209. The plurality of interior fitting threads 208 and the plurality of exterior fitting threads 209 are distributed along opposed sides of the fitting sidewall 207. A threaded connection is preferred in this instance for the combination of an extensible connection and the capacity for continuous tightening. More precisely, the plurality of interior fitting threads 208 is engaged along the mounting ring 105 such that the fitting sidewall 207 may be advanced or retracted along the mounting ring 105 to affect the vertical offset of the inner collar 107. In parallel, the outer collar 201 is selectably engaged along the plurality of exterior fitting threads 209 to enable the selective capture of the anchor shaft 103 as outlined above. In practice, the placement of the plurality of interior fitting threads 208 and the plurality of exterior fitting threads 209 allows a single torsional action to simultaneously seat the inner collar 107 to a minimum Z-offset and rigidly fix the orientation of the spherical bearing 109 as the outer collar 201 is tightened onto the inner collar 107.

Figure 12:
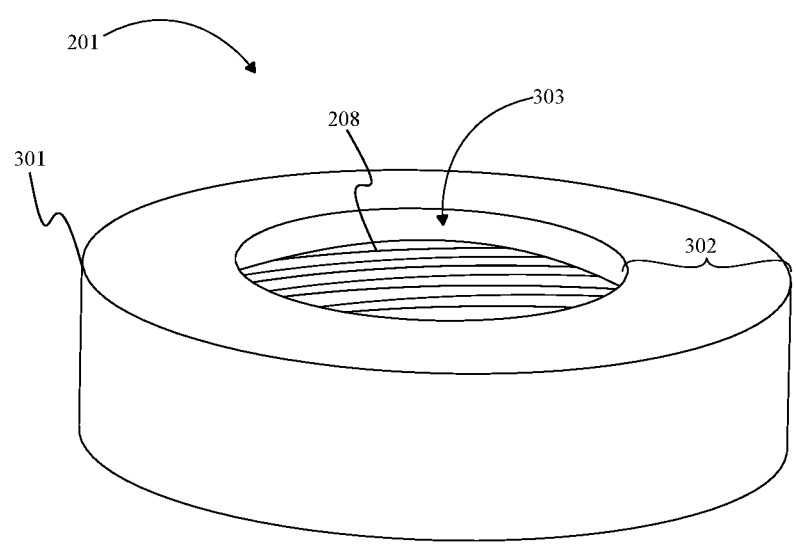
FIG. 12 is detailed, enlarged view of an exemplary embodiment of the outer collar.

In one alternate embodiment, the outer collar 201 comprises an external sleeve 301, a second flange 302, and a second aperture 303 as indicated in FIG. 12. The overall structure of the outer collar 201 is generally similar to the structure of the inner collar 107 as described above, such that the inner collar 107 and the outer collar 201 constitute nested instances at appropriate scale for the outer collar 201 to partially enclose the inner collar 107. More precisely, the external sleeve 301 is terminally connected to the second flange 302, such that the second flange 302 extends orthogonal to the external sleeve 301. The second flange 302 provides an adjustment plane for the upper bearing seat 200, parallel in structure and function to the first flange 204 explained in relation to the inner collar 107. Likewise, the second aperture 303 traverses the external sleeve 301 and the second flange 302, such that the proximal end 104 of the anchor shaft 103 extends through the second aperture 303. Again, in parallel to the inner collar 107, the second aperture 303 and the second flange 302 may be adjusted in various alternate embodiments to attain a balance between compensation capacity and structural support. Ideally, the dimensions of the first aperture 205 and the second aperture 303 are identical to prevent one element from limiting the compensation range disproportionately without the commensurate benefits of a wider first flange 204 or second flange 302.

Further still, the external sleeve 301 comprises a sleeve sidewall and a plurality of sleeve threads in another embodiment. The plurality of sleeve threads is distributed along the interior sides of the sleeve sidewall such that the sleeve sidewall is selectably engaged to the inner collar along the plurality of sleeve threads. It is noted that this is a similar arrangement to the mounting ring 105 and the inner collar 107, in keeping with the nested arrangement referenced previously. In a preferred embodiment the sleeve sidewall has a tolerance to fixedly engage over the inner collar 107 when tightened into a final fixated position, e.g., a progressive taper of the diameter of the sleeve sidewall, or a graduated constriction between the beginning and end of the plurality of sleeve threads. In at least one embodiment the sleeve sidewall and the plurality of sleeve threads may constitute a means of destructively engaging into the inner collar 107, wherein the inner collar 107 is deformed under force to adopt the dimensions of the sleeve sidewall. This embodiment ideally constitutes a semi-permanent fixture, wherein the inner collar 107 is a sacrificial component expended per-installation.

Figure 13:
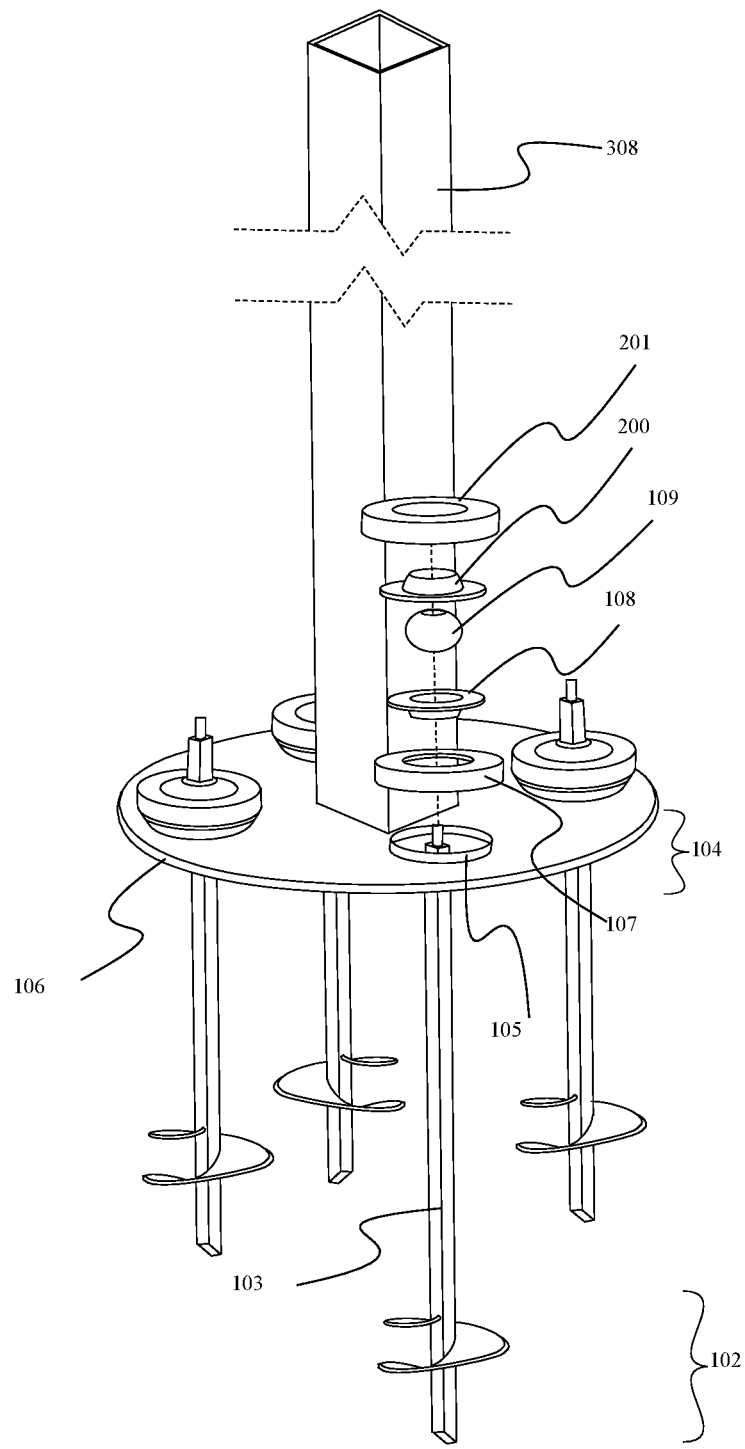
FIG. 13 is a perspective view of an alternate embodiment of the compensated anchor assembly, where a column assembly is fitted to the base plate.

In support of additional structures thereon, it is further proposed that the compensated anchor assembly 100 comprises at least one column assembly 308 as shown in FIG. 13. The column assembly 308 constitutes any type of affixed or erected structure selectably positioned onto the base plate 106. In at least one embodiment, the column assembly 308 is affixed to the base plate 106 post-fixation of the anchor shafts 103 utilizing pre-configured hardpoints integral to the base plate 106. In another embodiment, the column assembly 308 may itself be integral to the base plate 106, where the base plate 106 and column assembly 308 are manipulated into a final position as a composite unit. It is broadly considered that the column assembly 308 may function as a modular component, to the base plate 106, enabling the attachment and exchange of multiple types of column assemblies 308 to a universally compatible instance of the base plate 106.

Figure 14:
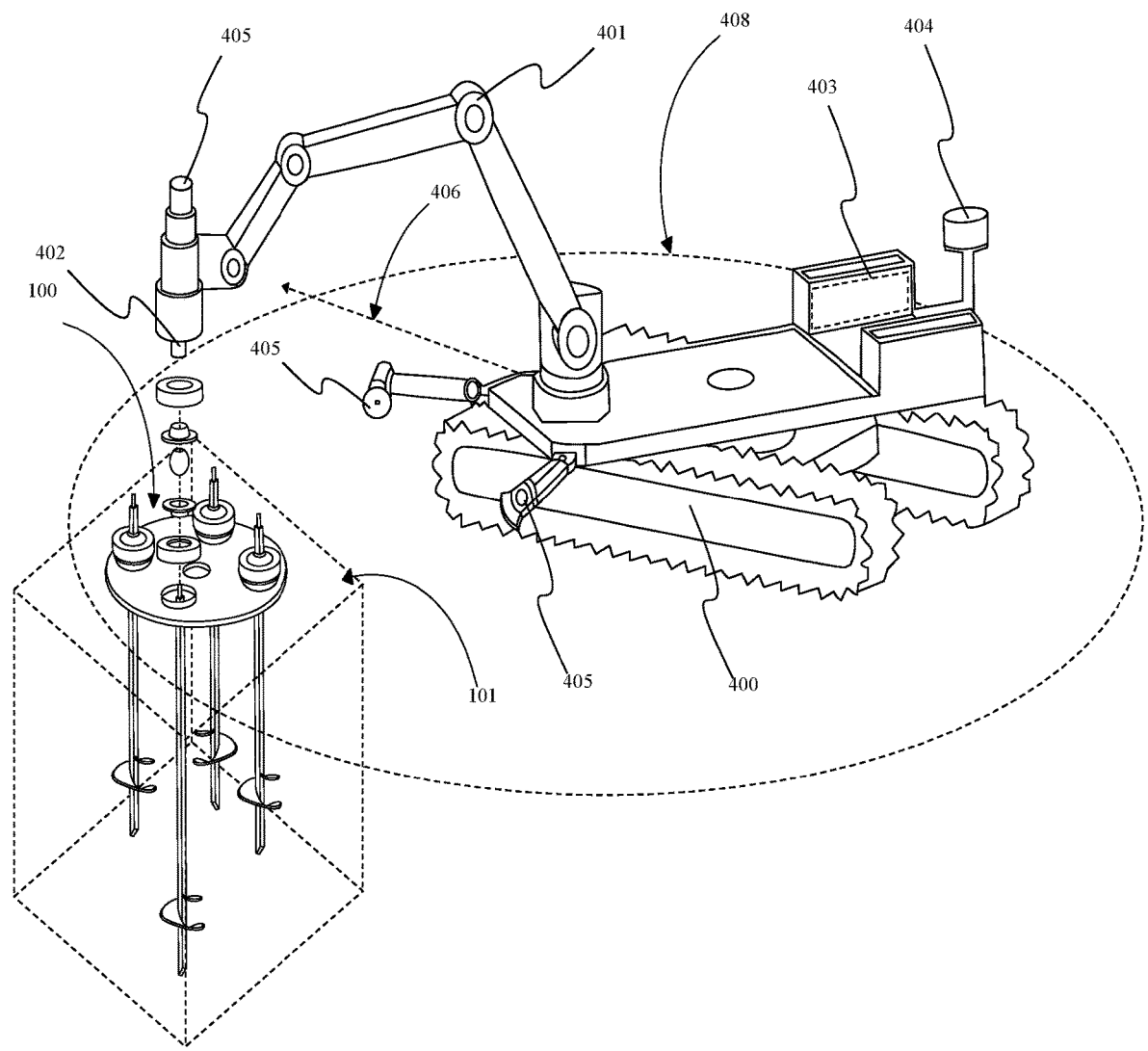
FIG. 14 is an exemplary perspective view of a robotic installation apparatus used to execute programmable instructions for positioning the compensated anchor system into the selected anchor location.

The present invention further provides an associated method for the autonomous installation of the compensated anchor assembly 100, where the above-described components are sequentially deployed according to a digitized site plan. Referring to FIG. 14, the method begins by providing a mobile platform 400, at least one manipulator arm 401, an installation tool 402, a controller 403, a navigation system 404, and a sensor package 405. The mobile platform 400 constitutes any means of autonomously maneuvering a tool and equipment about a work site, ideally defining a dedicated unmanned ground vehicle. The at least one manipulator arm 401 constitutes a serial robotic arm mounted to the mobile platform 400 such that the end-effector of the arm may reach any selected area within the work site, either directly or after relocating the mobile platform 400. The installation tool 402 generally refers to any means by which the compensated anchor assembly 100 may be installed into the selected anchor location 101. The installation tool 402 ideally refers to an impacting drill with a compound socket of suitable dimensions to engage all components of the compensated anchor assembly 100 in the sequence outlined above, but it is understood that the installation tool 402 may be configured as a modular attachment to the manipulator arm 401 in at least one embodiment.

The controller 403 refers to a processor, input device, and any form of digital data storage configured to store and execute logically ordered instructions. The controller 403 is primarily responsible for translating operator inputs into machine-executable instructions for the mobile platform 400, the manipulator arm 401, and the installation tool 402. The controller 403 may further constitute any requisite networked entities (e.g., control terminals, off-site processors, external operator controls, etc.) connected via any type or variety of wireless communication system known in the art. Further, the controller 403 is configured to receive and interpret data from the navigation system 404 and the sensor package 405 to derive corrective actions based on observed conditions in the work site.

Accordingly, the navigation system 404 refers to any type or combination of positional guidance system typically associated with gross positioning of automated self-propelled equipment. In one embodiment, the navigation system 404 constitutes a satellite transceiver configured for use with the Global Positioning System (GPS; or international equivalents) such that the navigation system 404 may derive the current position, heading, and velocity of the mobile platform 400. In addition, the navigation system 404 may incorporate local visual indicia, radio beacons, inertial guidance, or any other known navigational aid to determine positional data of the mobile platform 400 on the working site. Such navigational aids may further constitute digital monuments positioned within a simulacrum of the working site generated by the navigation system 404, e.g., survey marks, structures, utilities, plot boundaries, roadways, storage sites, and topographical features.

The sensor package 405 refers to any type or variety of local machine-vision or object detection components as may be realized by one of skill in the art. In one instance, the sensor package 405 may incorporate topographical scanners to digitize the layout of a targeted sector of the work site to ensure positional accuracy, or as a navigational aid to prevent collision or entanglement of the mobile platform 400. In another instance, the sensor package 405 may utilize magnetic probes to detect the position and orientation of any pre-positioned construction aids placed throughout the work site, including prior-placed components of the compensated anchor assembly 100 for quality control. Further, still, ultrasonic feedback arrays may be arranged to detect and digitize the subsurface position and orientation of any items that may obstruct the placement of the compensated anchor assembly 100. Optical guidance may also be utilized, either as a standalone photogrammetric recognition system, or in conjunction with preplaced fiducial monuments of known qualities. In addition to the contactless scanning elements, it is also proposed that the sensor package 405 incorporates contact and torsion sensors associated with the installation tool 402, such that the torsion applied to any installed component may be ascertained and compared to known-good values for automated quality control.

Figure 15:
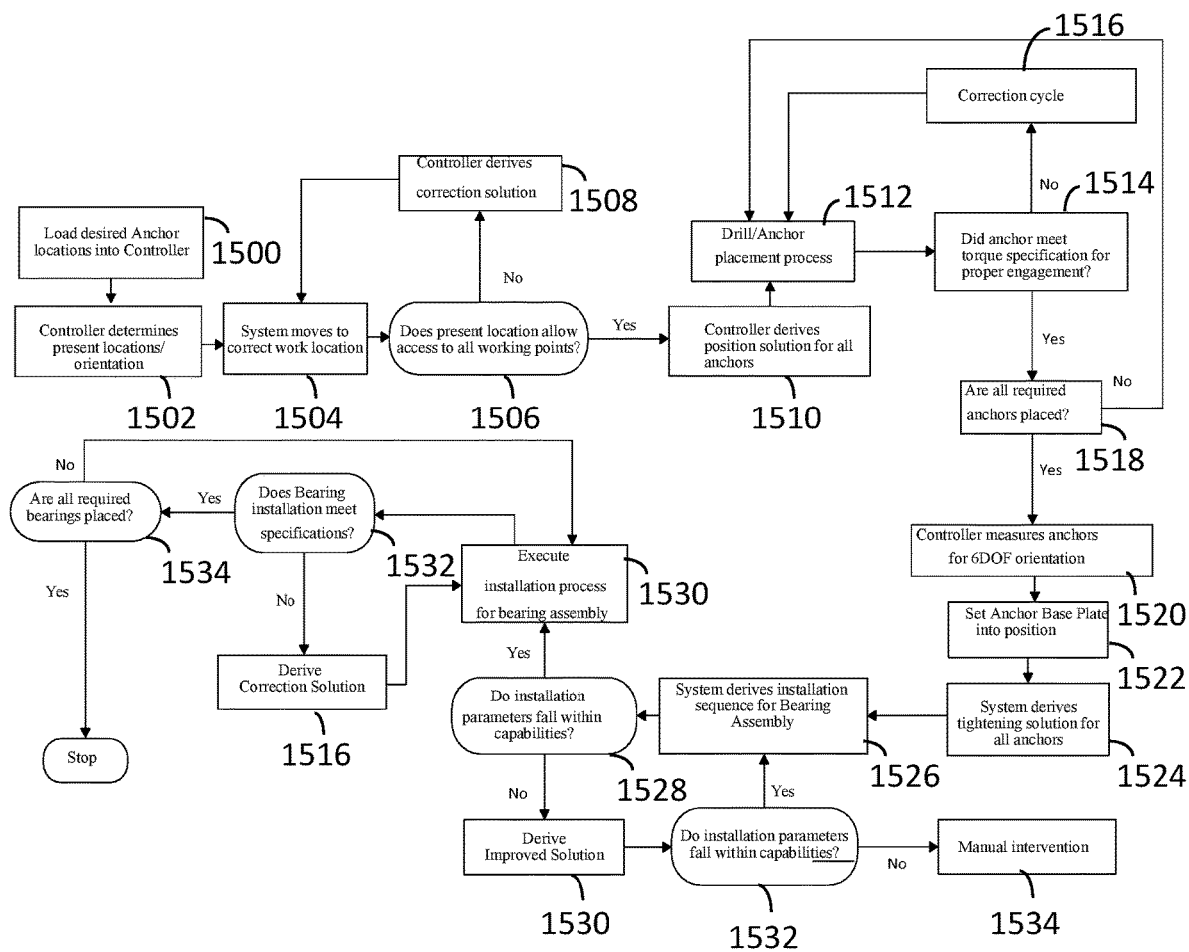
FIG. 15 is a flowchart illustrating the overall process and sub-processes of the disclosed installation method.

In reference to FIG. 15, the automated installation process begins by loading desired anchor locations into the controller 1500. That is, selected anchor location 101 is entered into the controller 403. The selected anchor location 101 generally constitutes a cleared or prepared area of the work site that is slated to support a single instance of the compensated anchor assembly 100. The selected anchor location 101 is ideally digitized as a discrete series of coordinates recognizable by the navigation system 404 and reachable by the manipulator arm 401. Further, special instructions related to the precise position and desired final orientation of each of the associated instances of the anchor shaft 103 may be appended to the digital instance of the selected anchor location 101 within the controller 403 for later use in determining operative actions of the manipulator arm 401 and the installation tool 402.

The controller then determines anchor locations and orientations 1502. This involves resolving the selected anchor location 101 into a motion path 406. The motion path 406 constitutes a series of machine-instructions for the motive elements of the mobile platform 400 to displace the mobile platform 400 across the working site to reach the selected anchor location 101. More specifically, the navigation system 404 is configured to determine the shortest unobstructed route to bring the manipulator arm 401 into range of the maximal number of serviceable instances of the compensated anchor assembly 100. In one instance, the motion path 406 is rendered in simulation within a digital copy of the work site generated by the navigation system 404 and may incorporate a human operator into an approval loop in accordance with best practices for conventional heavy equipment operation. In another instance, the mobile platform 400 may operate independently, relying on guidance cues from the navigation system 404 and the sensor package 405 to avoid collisions.

Next, the system moves to the correct work location 1504. That is, the mobile platform 400 is displaced along the motion path 406. The navigation system 404 executes machine motion according to the digitized copy of the working site and any detectable navigational aids, as the sensor package 405 monitors the immediate surroundings of the mobile platform 400 in-motion to preempt any collision or entanglement with unexpected obstacles in the working site. This may be implemented with a feedback path with a decision block to determine if the target location allows access to all working points 1506. If not (1506—No), the controller derives a correction solution 1508 and control returns to block 1504. If so (1506—Yes), control proceeds to block 1510.

In block 1510, the controller derives position solutions for all anchors. In other words, the selected anchor position along the motion path 406 are identified with the sensor package 405. The sensor package 405 positively recognizes and locates the selected anchor position. Positive identification is ideally made based upon characteristics appended to the initial input of the selected anchor position via the controller 403, such as a unique identifying indicium or fiducial detectable by the sensor package 405. This type of deterministic identification is preferred for the relative certainty assured using a prepositioned fiducial, but the sensor package 405 may also gather environmental data to make holistic judgments for identification of the selected anchor location 101. For example, the sensor package 405 may compare the local terrain, soil compaction, surface indentations, and landmarks against a known data set to reach a configurable confidence level for identification of the selected anchor location 101.

An anchor is then placed 1512. The mobile platform 400 moves along the motion path 406 to displace the installation tool 402 at the selected anchor location 101 using the manipulator arm 401. The disposition of the manipulator arm 401 is likewise controlled against impact with structures in the work site by an implementation of the sensor package 405 and general automation best-practices. The anchor installation placement process includes the installation tool 402 positioning at least one anchor shaft 103 into the selected anchor location 101. The installation tool then positions the base plate 106 about the anchor shaft 103. It then places the inner collar 107 onto the base plate 106, it then positions the lower bearing seat 108 into the inner collar 107, it then positions the spherical bearing 109 into the lower bearing seat 108, it then positions the upper bearing seat 200 onto the spherical bearing 109, and finally fixes the outer collar 201 over the upper bearing seat 200. A preconfigured torsional load is exerted against the outer collar 201 with the installation tool 402 to ensure that the compensated anchor assembly 100 is rigidly fixed onto the selected anchor location 101, such that each anchor shaft 103 rigidly supports the base plate 106 in a preselected orientation and position. The automated installation process then repeats for each instance of the compensated anchor assembly 100 within the working site.

Once the anchor is placed, it is determined whether the anchor meets torque specifications 1514. If not (1514—No), a correction cycle is entered 1516, with control returning to the drill and anchor process of block 1512. If so (1514—Yes) it is determined whether all anchors are placed 1518. If not (1518—No), control returns to the drill and anchor process 1512. If so (1518—Yes), the controller measures the anchors for 6DOF orientation. The anchor base plate is then set into position 1522. The system then derives tightening solutions for all anchors 1524. The system then derives an installation sequence for the bearing assembly 1526. It is then determined whether the installation parameters are sufficient 1528. If not (1528—No), the controller derives an improved solution 1530. If the installation parameters are insufficient (1532—No), there is a manual intervention 1534. If the installation parameters are sufficient (1532—Yes), control returns to block 1526.

If the installation parameters are sufficient (1528—Yes), a bearing assembly installation process is executed 1530. It is then determined whether the bearing installation meets specifications 1532. If so (1532—Yes), it is determined if all bearings are placed 1534. If so (1534—Yes), processing is completed. If not (1534—No), control returns to block 1530. If the bearing installation process does not meet all specifications (1532—No), a correction solution is derived 1516 and control returns to block 1530.

Once all instances of the compensated anchor assembly 100 are serviced, the mobile platform 400 may be removed from the work site to enable the fixation of external structures onto each instance of the base plate 106. Alternatively, the mobile platform 400 may remain within the working site and engage with the compensated anchor assembly 100 via the manipulator arm 401 as a static reinforcement. In this embodiment, it is contemplated that each instance of the compensated anchor assembly 100 is associated with a corresponding instance of the mobile platform 400. The manipulator arm 401 thereof remains fixed to the compensated anchor assembly 100 until such time as an operator directs the mobile platform 400 to displace to a new instance of the selected anchor location 101.

The motion path 406 may be optimized to bring the manipulator arm 401 into range of multiple instances of the compensated anchor assembly 100 simultaneously. This sub-process begins by defining a manipulator range 408 within the controller 403, where the manipulator range 408 defines the maximum distance that the manipulator arm 401 may project from the mobile platform 400 to effectively utilize the installation tool 402 on the compensated anchor assembly 100.

The sub-process continues by retrieving multiple instances of the selected anchor location 101, thereby enabling the navigation system 404 to plot multiple objectives within the digitized workspace. Accordingly, the motion path 406 is updated to bring the mobile platform 400 within the manipulator range 408 of the multiple instances of the selected anchor location 101. The motion path 406 is ideally derived by applying an optimum nesting process to the multiple instances of the selected anchor location 101, where the manipulator range 408 is overlaid across the digitized work site and encompasses the greatest number instances of the selected anchor location 101. This sub-process is also iterative.

It is further contemplated that at least one anchor shaft 103 of any instance of the compensated anchor assembly 100 may be deliberately positioned into the selected anchor location 101 with an angular deviation relative to the base plate 106. A sub-process for establishing this angular offset begins by deriving an anchor orientation vector. The anchor orientation represents the general direction and depth of penetration of the corresponding anchor shaft 103 into the selected anchor location 101. The installation tool 402, as positioned by the manipulator arm 401, may be deliberately offset along the anchor orientation vector to create such an angular deviation to, for example, avoid a buried obstacle that would obstruct a normal installation. Further, the anchor shaft 103 may be deliberately offset to improve the engagement of the anchor shaft 103 within the selected anchor location 101, i.e., the anchor shaft 103 protruding across both lateral and vertical planes is more difficult to dislodge than a simple vertical installation.

The sub-process continues by installing the anchor shaft 103 along the anchor orientation vector with the installation tool 402. According to the previously outlined component 'stack', it is therefore necessary to engage the subsequent components of the compensated anchor assembly 100 along the same anchor orientation vector. Therefore, the sub-process concludes by returning to the anchor orientation vector for each subsequent component of the compensated anchor assembly 100. In practice this sub-process enables the anchor shaft 103 to be installed in an orientation-agnostic manner. As a result, the prescribed arrangement of the compensated anchor assembly 100 is not reliant upon a substantially vertical orientation (i.e., gravity) to layer the components correctly.

In yet another sub-process, each instance of the compensated anchor assembly 100 may be installed with a preset torque-specification, corresponding to the fixity of the anchor shaft 103 to the base plate 106. The sub-process begins by providing an installation torque value to the installation tool 402, such that the installation tool 402 renders a corresponding torsional force onto the outer collar 201 of the compensated anchor assembly 100 during installation.

The installation is subsequently monitored and assessed by the sensor package 405 for adherence to the requirements of any given installation (e.g., height of the base plate 106, depth of the anchor shaft 103, compression of the inner collar 107, etc.). The subprocess continues by retrieving a feedback metric from the sensor package 405, where the feedback metric compartmentalizes the various data points associated with a prescribed installation of the compensated anchor assembly 100 for processing by the controller 403. Accordingly, a corrective measure is derived using the controller 403 if any deviation from the prescribed values is detected.

The corrective measure generally defines an increment to the installation torque value, with the understanding that a reduction of the installation torque value may not necessarily displace the anchor shaft 103 within the selected anchor location 101. Ideally, this sub-process is implemented with a margin-of-error on the upper ranges of the installation torque value, preventing the installation tool 402 from over-fastening the outer collar 201 prior to assessment by the sensor package 405. Thus, the sub-process concludes by executing the corrective measure with the installation tool 402 to precisely achieve the desired installation, within the correct specifications as determined according to the needs and functions of each instance of the compensated anchor assembly 100.

Although the invention has been explained in relation to its preferred embodiment and best-method, including several branching permutations thereof, it is to be understood that many other possible modifications and variations can be made without departing from the original spirit and scope of the present invention.

The invention claimed is:
1. An apparatus, comprising:
   an anchor shaft with a distal end configured to be embedded into a selected anchor location;
   a base plate with an aperture to receive the anchor shaft;
   a mounting ring surrounding the aperture;
   an inner collar adjustably mounted on the mounting ring;
   a lower bearing seat being positioned in the inner collar;

a spherical bearing positioned in the lower bearing seat, the spherical bearing engaging a proximal end of the anchor shaft;

an upper bearing seat positioned over the spherical bearing;

an outer collar mounted on the inner collar;

the upper bearing seat, the spherical bearing, and the lower bearing seat being compressed between the outer collar and the inner collar, such that the anchor shaft is selectably mounted to the base plate and has six degrees of configurable positions;

wherein the inner collar has an interstitial fitting, a first flange, and a first aperture, the interstitial fitting being terminally connected to the first flange, such that the first flange extends orthogonal to the interstitial fitting, and the first aperture is within an outer perimeter of the first flange, wherein the proximal end of the anchor shaft extends through the first aperture; and wherein the interstitial fitting has a fitting sidewall, interior fitting threads, and exterior fitting threads, the interior fitting threads and the exterior fitting threads being distributed along opposed sides of the fitting sidewall, the fitting sidewall being selectably engaged to the mounting ring along the interior fitting threads, and the outer collar being selectably engaged along the exterior fitting threads.

2. The apparatus of claim 1 wherein the outer collar has an external sleeve, a second flange, and a second aperture, the external sleeve being terminally connected to the second flange, such that the second flange extends orthogonal to the external sleeve and the second aperture is within an outer perimeter of the second flange, wherein the proximal end of the anchor shaft extends through the second aperture.

3. The apparatus of claim 2 wherein the external sleeve has a sleeve sidewall and sleeve threads, the sleeve threads being distributed along the interior sides of the sleeve sidewall, the sleeve sidewall is selectably engaged to the inner collar along the sleeve threads.

4. The apparatus of claim 2 further comprising a column positioned on the base plate.

\* \* \* \* \*